United States Patent [19]
Baechler et al.

[11] Patent Number: 5,460,399
[45] Date of Patent: Oct. 24, 1995

[54] BABY STROLLER WITH PARK BRAKE

[75] Inventors: Philip A. Baechler, Yakima; Timothy O. Armstrong, Woodinville, both of Wash.

[73] Assignee: Racing Strollers, Inc., Yakima, Wash.

[21] Appl. No.: 122,636

[22] Filed: Sep. 15, 1993

Related U.S. Application Data

[63] Continuation-in-part of Ser. No. 948,913, Sep. 18, 1992, Pat. No. D. 343,812.

[51] Int. Cl.$^6$ ..................................... B62B 7/06
[52] U.S. Cl. ................... 280/650; 188/20; 280/47.38; 280/62
[58] Field of Search ................. 188/19, 20, 2 F, 188/69, 72.7, 72.9; 280/642, 647, 650, 47.34, 47.38, 62

[56] References Cited

U.S. PATENT DOCUMENTS

| Re. 3,636 | 9/1869 | Christian . | |
|---|---|---|---|
| D. 204,254 | 4/1966 | Cerf | D14/14 |
| D. 297,525 | 9/1988 | Baechler | D12/129 |
| D. 315,885 | 4/1991 | Jacobs | D12/129 |
| 482,708 | 9/1892 | Watkins | 188/20 |
| 495,211 | 4/1893 | Watkins | 188/20 |
| 699,186 | 5/1902 | Katzke . | |
| 2,425,688 | 8/1947 | Schulte | 280/36 |
| 2,634,137 | 4/1953 | Welden | 188/20 X |
| 2,988,175 | 6/1961 | West | 188/69 X |
| 3,781,031 | 12/1973 | Patin | 280/62 |
| 3,870,371 | 3/1975 | Solomon | 301/1 |
| 4,346,912 | 8/1982 | Habib | 280/644 |
| 4,527,665 | 7/1985 | Shamie | 188/20 |
| 4,570,956 | 2/1986 | Dyer | 280/30 |
| 4,618,184 | 10/1986 | Harvey | 297/19 |
| 4,847,945 | 7/1989 | Schwartz et al. | 16/30 |
| 4,917,442 | 4/1990 | Johnson | 301/113 |
| 4,953,880 | 9/1990 | Sudakoff et al. | 280/47.38 |
| 4,958,842 | 9/1990 | Chang | 280/7.1 |
| 4,963,115 | 10/1990 | Dabin et al. | 446/96 |
| 5,029,891 | 7/1991 | Jacobs | 280/650 |
| 5,076,599 | 12/1991 | Lockett et al. | 280/62 X |
| 5,123,670 | 6/1992 | Chen | 280/650 |
| 5,176,395 | 1/1993 | Garforth-Bles | 280/62 X |
| 5,188,389 | 2/1993 | Baechler et al. | 280/650 |
| 5,259,634 | 11/1993 | Berner et al. | 280/650 X |
| 5,259,635 | 11/1993 | Picker | 280/650 X |

*Primary Examiner*—Mitchell J. Hill
*Assistant Examiner*—Michael Mar
*Attorney, Agent, or Firm*—Seed and Berry

[57] ABSTRACT

An all-terrain stroller having a pair of rear wheels, each having a receiver fixedly attached thereto for rotation therewith. The receiver has a plurality of circumferentially distributed receiver openings which open inward toward the opposite rear wheel. A pair of brake rods is movably supported by the rear axle of the stroller for lateral movement of each toward and away from one of the receivers under the urging of a coil spring. A foot pedal actuator is rotatable between brake engaged and disengaged positions. The foot pedal carries a cam which moves the brake rods toward and into one of the receiver openings of the corresponding receiver when the brake pedal is rotated to engaged position to lock the rear wheels against rotational movement. The cam permits withdrawal of the brake rods from the receiver openings when the foot pedal is rotated to the disengaged position. The foot pedal is provided with stops to limit rotation of the foot pedal beyond the engaged and disengaged positions. The strollers uses a frame with a pair of substantially straight horizontal base frame tubes which are each rotatably connected to the rear axle by a connector having a transverse tubular portion which rotatably receives the rear axle.

23 Claims, 4 Drawing Sheets

BABY STROLLER WITH PARK BRAKE

CROSS-REFERENCE TO RELATED APPLICATIONS

This application is a continuation-in-part of U.S. application Ser. No. 07/948,913, filed Sep. 18, 1992, now issued as U.S. Pat. Des. No. 343,812.

TECHNICAL FIELD

The present invention relates to baby strollers, and more particularly, to all-terrain baby strollers.

BACKGROUND OF THE INVENTION

Traditionally, baby strollers have been used to push an infant slowly on a relatively hard, smooth floor or sidewalk. As a result, the strollers were made small and light. These strollers work well enough at slow speed, but are extremely unwieldy and even dangerous on rough surfaces or at higher speeds.

As parents have become more health conscious in recent times, jogging and fast walking has become a popular pastime. Because baby strollers were not designed to be operated at high speed or on rough terrain, parents could jog or fast walk only when another person was available to baby-sit. As any parent knows, it is not always easy to find babysitters, so the ability of the parent to stay in shape by jogging or fast walking was severely limited.

Even for non-jogging parents, the need for an improved baby stroller has been apparent. The small, plastic wheels customarily used for baby strollers are almost useless when it is desired to walk with an infant in a grassy park or on a rough road or sidewalk. Parents end up not walking with the infant at all or only walking in limited areas.

All-terrain baby strollers have been designed to overcome these problems. These strollers typically employ much larger wheels, often large bicycle tires. The stroller frame and frame connections are constructed to be stronger and larger to handle the heavy duty use they may receive. It is now quite common to see a parent pushing an infant while jogging, fast walking or even just slow walking in grassy, bumpy -areas or over other rough terrain.

These new strollers are sometimes equipped with conventional caliper brakes actuated by a hand lever to help slow and stop the stroller. Once stopped, however, there has been no effective way to insure the stroller does not roll away while the parent removes his or her hands from the stroller, such as to tie a loose shoe lace, other than a tether line attached at one end to the stroller and at the other end to the parent. Of course, the parent could continue to apply the caliper brake, but doing so is difficult or impossible in many situations, and inconvenient in most others. If the stroller is not equipped with a caliper brake, no sure way exists to prevent the stroller from rolling away, especially when parked on an incline.

It can be appreciated that a substantial need exists for a park brake for use on a stroller, especially an all-terrain stroller. The present invention provides such a park brake. The brake has a simple and inexpensive construction, is easy to use and provides a reliable and safe brake.

SUMMARY OF THE INVENTION

The present invention resides in a portable baby stroller and a park brake therefor. The baby stroller has a frame with a rear, transversely extending axle and a rear wheel mounted to the axle at an end thereof for rotation relative to the frame.

A receiver is fixedly attached to the rear wheel for rotation with the rear wheel. The receiver has a plurality of circumferentially positioned openings on an inward side thereof in concentric relation to the axle.

A brake member is supported by the frame for lateral movement relative to the axle toward and away from the receiver, and is restrained against rotation about the axle. In a preferred embodiment, the brake member is a brake rod. The brake member is outwardly movable to position an outward end thereof in a correspondingly positioned one of the receiver openings, and inwardly movable to withdraw the outward end from the receiver opening within which positioned.

An actuator is in operative engagement with the brake member. The actuator includes a manually operable control member movable between a brake engagement position and a brake disengagement position. In the preferred embodiment, the actuator includes a foot pedal rotatably supported by the axle.

The actuator moves the brake member toward the receiver to position the outward end thereof in the correspondingly positioned receiver opening when the control member is moved to the brake engagement position. The actuator moves the brake member away from the receiver to withdraw the outward end thereof from the correspondingly positioned receiver opening when the control member is moved to the brake disengagement position. In the preferred embodiment, each of the rear wheels is provided with a receiver and a brake member that operates therewith.

The actuator includes a cam carried by the control member and engaging the brake member so as to progressively move the brake member toward the receiver as the control member is moved from the brake disengagement position toward the brake engagement position. The actuator includes a bias member biasing the brake member away from the receiver, and into operative engagement with a cam. The cam includes a lock portion engaged by the brake member as the control member approaches the brake engagement position. The lock portion is oriented to produce substantially no lateral movement of the brake member toward the receiver as the control member is moved further toward the brake engagement position. In the preferred embodiment, the receiver includes a plurality of radially extending ribs which define the receiver openings therebetween. In one embodiment, the receiver is formed as an integral part with a wheel hub for the rear wheel. In another embodiment, the receiver is formed as a separate part fixedly attached to the wheel hub.

Other features and advantages of the invention will become apparent from the following detailed description, taken in conjunction with the accompanying drawings.

DETAILED DESCRIPTION OF THE INVENTION

Figure 1:
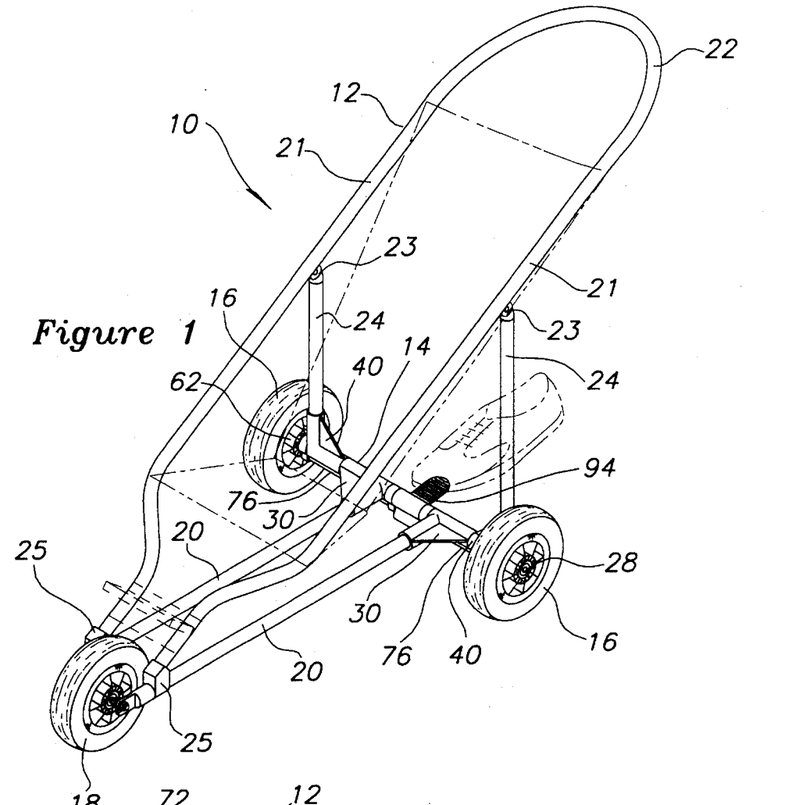
FIG. 1 is an isometric view of a baby stroller embodying the present invention, but without a seat being shown.

As shown in the drawings for purposes of illustration, the present invention is embodied in an all-terrain baby stroller 10 having a foldable frame 12 with a rear axle assembly 14. Left and right rear wheels 16 are rotatably mounted to the rear axle assembly 14. The forward end of the frame 12 has a single front wheel 18 rotatably mounted thereto. The frame 12 includes left and right side horizontal base frame tubes 20 extending rearwardly from the front wheel 18, in parallel spaced-apart relation to each other, to the rear axle assembly 14. The horizontal base frame tubes 20 are manufactured from straight tube stock without the need to use a bending operation to form the horizontal base frame tube. The horizontal base frame tubes 20 are oriented at a 90° angle with respect to the rear axle assembly 14.

The frame 12 also includes left and right, downwardly sloping upper frame tubes 21 which at a rearward end define an arcuate handle 22 and extend downwardly therefrom to the horizontal base frame tubes 20 at a position near the rearwardmost extent of the front wheel 18. The forward ends of the upper frame tubes 21 are releasably coupled to the horizontal base frame tubes 20 by left and right frame connectors 25 to permit folding of the stroller 10. The handle 22 is positioned at a height convenient for a user to push the stroller 10.

The frame 12 further includes left and right upright support tubes 24 extending between the rear axle assembly 14 and the upper frame tubes 21 at a position below and forward of the handle 22. The upright support tubes 24 are pivotally connected to the upper frame tubes 21 by pivot joints 23, and fixedly connected to the rear axle assembly 14 by couplers as will be described below to permit folding of the stroller when the frame connectors 25 are released to free the forward ends of the upper frame tubes from the horizontal base frame tubes 20.

The rear axle assembly 14 uses a non-rotating tubular metal axle 26 (best shown in FIG. 2) having left and right ends, each with a threaded insert (not shown) to threadably receive a threaded axle bolt 28 on which a corresponding one of the left and right rear wheels 16 is rotatably mounted. Each of the horizontal base frame tubes 20 is coupled to the tubular axle 26 by a first coupler 30 with a tubular connector portion 32 rotatably receiving the tubular axle 26 therethrough to permit rotation of the horizontal base frame tubes relative to the tubular axle upon folding of the frame 12 for storage. The first coupler 30 also has a frame tube receiver portion 34 within which a corresponding one of the left or right horizontal base frame tubes 20 is inserted and fixed in place using a rivet 36. A gusset 38 is fixedly attached to both the tubular connector portion 32 and the frame tube receiver portion 34 of each first coupler 30 to rigidly hold them together.

Figure 2:
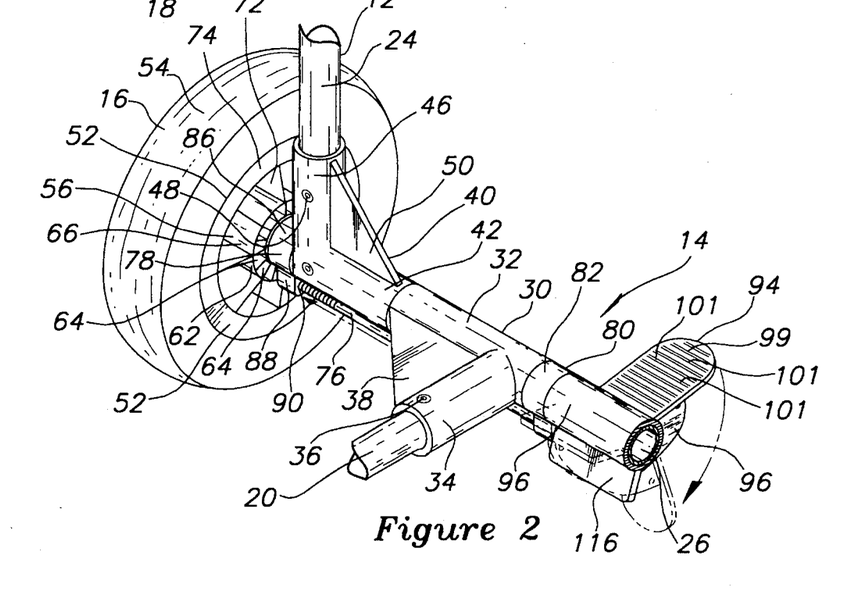
FIG. 2 is an enlarged, fragmentary view of the axle and park brake assembly of FIG. 1 showing the right side wheel.

Each of the upright support tubes 24 is coupled to the tubular axle 26 by a second coupler 40 with a tubular connector portion 42 receiving the tubular axle 26 therein. The tubular connector portion 42 and the tubular axle 26 are fixedly attached together by a rivet 44. The second coupler 40 also has a frame tube receiver portion 46 within which a corresponding one of the left or right upright support tubes 24 is inserted and fixed in place using a rivet 48. A gusset 50 is fixedly attached to both the tubular connector portion 42 and the frame tube receiver portion 46 of each second coupler 40 to rigidly hold them together. As a result, the upright support tubes 24 and the tubular axle 26 are fixed together and rotate as a unit when the frame 12 is folded for storage. With this arrangement, the first coupler 30, which holds one of the horizontal base frame tubes 20, and the second coupler 40, which holds one of the upright support tubes 24, can be freely rotated relative to each other by a sufficient amount to allow the folding of the upright support tubes downward relative to the horizontal base frame tubes for folding of the stroller 10.

Figure 4A:
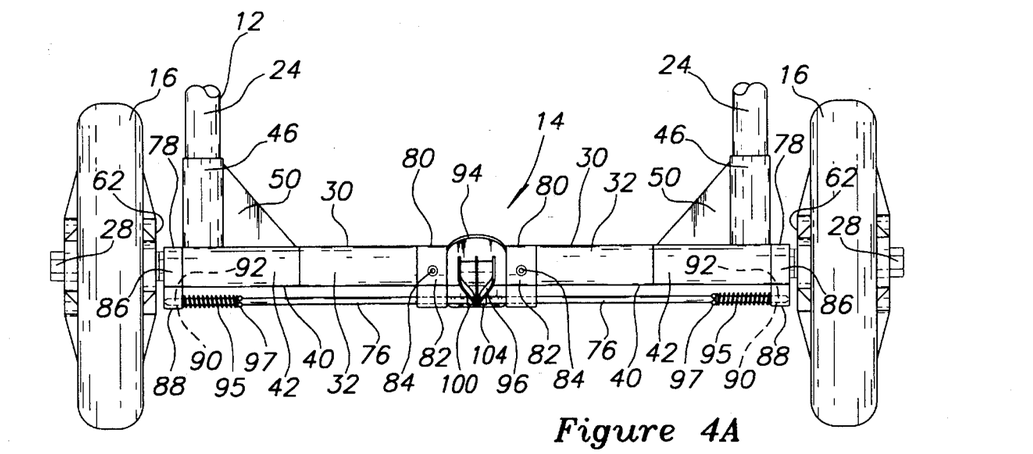
FIG. 4A is an enlarged, fragmentary, rear view of the axle and park brake assembly of FIG. 1 shown with the brake disengaged.
Figure 4B:
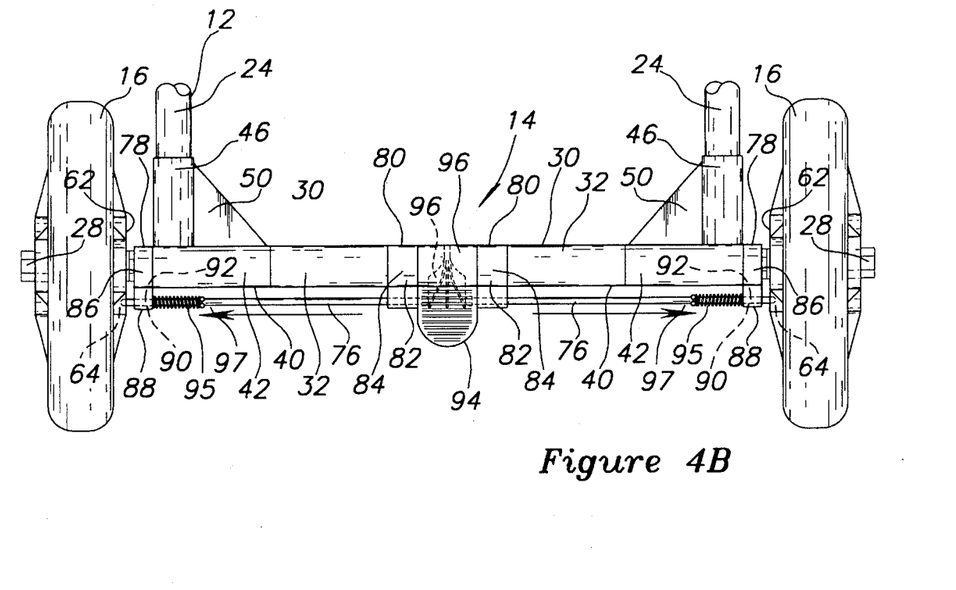
FIG. 4B is an enlarged, fragmentary, rear view of the axle and park brake assembly of FIG. 1 shown with the brake engaged.
Figure 4C:
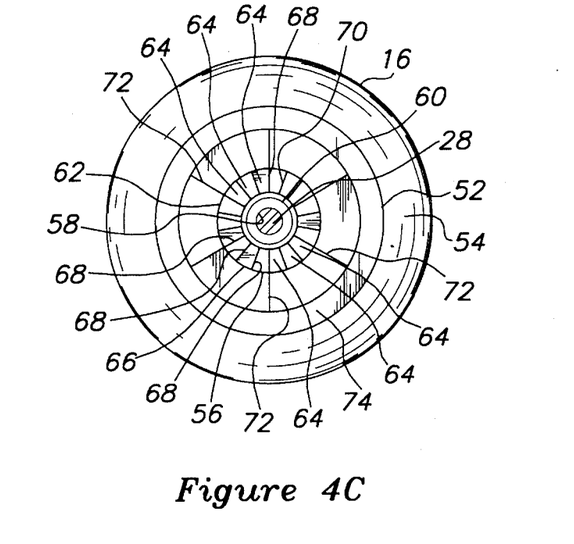
FIG. 4C is an enlarged side, elevational view of a wheel used with the stroller of FIG. 1.

As best shown in FIG. 4C, each of the left and right rear wheels 16 includes a rim 52 on which a tire 54 is mounted. The rim 52 includes a hub 56 having a central aperture 58 through which one of the axle bolts 28 extends for rotation of the wheel on the axle bolt. The hub 56 includes a central portion 60 and a receiver portion 62 extending circumferentially about the hub central portion 60. The receiver portion 62 has a plurality of uniformly sized receiver openings 64 which are arranged circumferentially about the hub central portion 60 in concentric arrangement with the tubular axle 26 when the wheel is mounted to the rear axle assembly 14. The receiver openings 64 of each rear wheel 16 open axially inward toward the other rear wheel.

The receiver portion 62 has a cylindrical outer wall 66 which extends circumferentially about the hub central portion 60 and is radially spaced apart therefrom in concentric relation thereto. A plurality of radially extending ribs 68 extends between the hub central portion 60 and the receiver portion outer wall 66 to define the receiver openings 64 therebetween. The ribs 68 have a laterally inward edge portion 70 with a wall thickness which tapers laterally inward.

The rim 52 also includes a plurality of radially extending support ribs 72 extending between the receiver portion outer wall 66 and an outer portion 74 of the rim on which the tire 54 is directly mounted. In the embodiment of the rear wheel 16 shown in FIGS. 1–4C, the hub 56, including the receiver portion 62, are formed integral with the rim 52 from a molded plastic material such that the receiver portion rotates with the rim as the rear wheel rotates.

The stroller 10 further includes left and right brake rods 76, each slidably supported below the rear axle assembly 14 and in spaced-apart parallel alignment with the tubular axle 26 by an outer support member 78 and an inner support member 80 spaced laterally apart from the outer support member. The inner support member 80 for each of the brake rods 76 has a tubular portion 82 receiving the tubular axle 26 therethrough and is fixedly attached to the tubular axle and thereby prevented from rotating relative thereto by a rivet 84. The inner support members 80 for the two brake rods 76 are positioned on the tubular axle at a central portion thereof but are spaced apart laterally from each other. Each of the tubular connector portions 32 of the first couplers 30 is rotatably mounted on the tubular axle 26 at a position between the corresponding inner support member 80 and the tubular connector portion 42 of the second coupler 40 on the same side of the tubular axle 26 to restrain lateral movement of the tubular connector portion 32 on the tubular axle.

The outer support member 78 for each of the brake rods 76 also has a tubular portion 86. The tubular portion 86 of the outer support member 78 supporting the left brake rod is positioned laterally outward of and adjacent to the tubular connector portion 42 of the second coupler 40 at the left axle end. The tubular portion 86 of the outer support member 78 supporting the right brake rod is positioned laterally outward of and adjacent to the tubular connector portion 42 of the second coupler 40 at the right axle end. Each of the tubular portions 86 receives therein a sleeve (not shown) which extends axially therethrough and into the adjacent tubular connector portion 42 of the adjacent second coupler 40, and terminates at the threaded insert (not shown) to which the axle bolt 28 is threadably attached. The sleeve has an inner diameter sized to allow the axle bolt 28 to pass therethrough. With this arrangement, the tubular portions 86 of the outer support members 78 are prevented from rotating relative to the tubular axle 26.

Each of the outer and inner support members 78 and 80 for each brake rod 76 has a downwardly projecting guide portion 88 with a laterally extending guide hole 90 slidably receiving the brake rod therein and permitting its free lateral movement toward and away from the adjacent one of the rear wheels 16, but restraining the brake rod against rotation about the tubular axle 26. The guide portions 88 hold the brake rods 76 at a position spaced below and away from the rear axle assembly 14 and parallel thereto. The guide portions 88 guide lateral movement of the brake rods to ensure their alignment with the receiving openings 64.

The left brake rod 76 is movable laterally to the left a sufficient distance beyond the left end of the tubular axle 26 and toward the receiver portion 62 of the left rear wheel 16 to position an outward end 92 of the left brake rod in one of the receiver openings 64 of the receiver portion of the left rear wheel aligned therewith so as to selectively inhibit rotation of the left rear wheel. The left brake rod is movable laterally to the right a sufficient distance away from the receiver portion of the left rear wheel to withdraw the outward end 92 of the left brake rod from the receiver opening so as to selectively allow rotation of the left rear wheel. Similarly, the right brake rod 76 is movable laterally left and right a sufficient distance to allow the outward end 92 of the right brake rod 76 to be positioned in and withdrawn from one of the receiver openings 64 of the receiver portion 62 of the right rear wheel aligned therewith to selectively inhibit and allow rotation of the right rear wheel. By simultaneously moving both of the left and right brake rods 76 laterally outward and into one of the receiver openings 64 with which aligned, a park brake is provided to prevent rotation of both rear wheels 16 and hence undesired movement of the stroller 10 when parked.

It is noted that the receiver openings 64 of the receiver portion 62 of each hub 56 have sufficient size and are spaced radially outward of the hub central portion 60 as to be in radial position to receive the outward end 92 of the corresponding brake rod 76. Since the receiver openings 64 are circumferentially distributed about the tubular axle, one of the receiver openings will always be in position to receive the guide rod regardless of the rotational position of the rear wheel. As previously noted, the inward edge portion 70 of the ribs 68 which define the receiver openings 64 have an inward taper which minimizes the resistance encountered should the outward end 92 of the brake rod 76 hit the inward edge portion 70 of one of the ribs 68 when the brake rod is moved laterally outward for insertion into one of the receiver openings to engage the park brake. For the same reason, the outward end 92 of the brake rod 76 is somewhat rounded.

Figure 5:
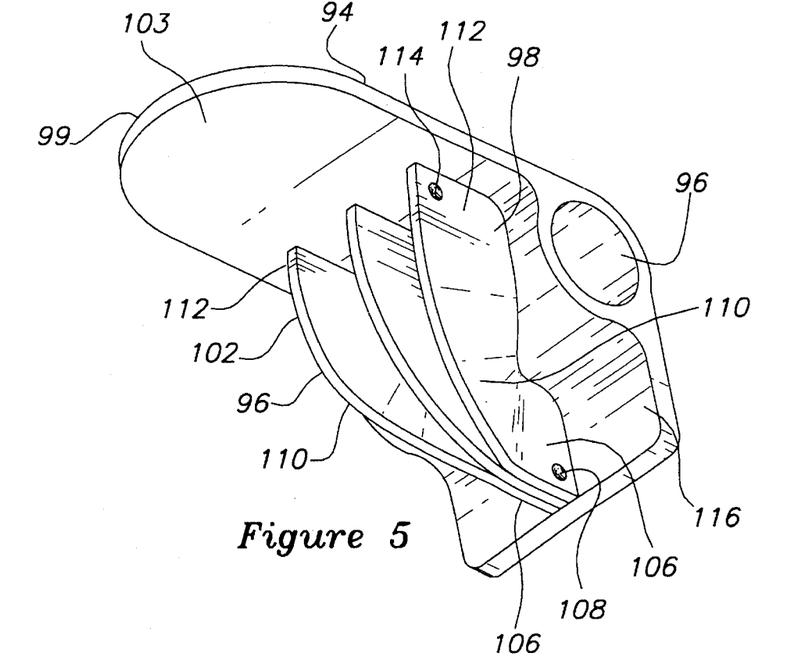
FIG. 5 is an enlarged isometric view of a foot pedal used with the stroller of FIG. 1.

To control lateral movement of the brake rods 76 and serve as an actuator of the brake rods 76, a manually operable foot pedal 94 is provided. As best shown in FIG. 5, the foot pedal 94 has a tubular connector portion 96 rotatably receiving the tubular axle 26 therethrough to permit rotation of the foot pedal about the tubular axle between a park brake engaged position and a park brake disengaged position. The foot pedal 94 has an upper surface 99 which, by pressing downward thereon with the user's foot, rotates the foot pedal to the engaged position. A plurality of raised portions 101 on the upper surface 99 reduce slippage when contact is made with the foot.

The foot pedal 94 is returned to the disengaged position by applying an upward force on an underside 103 (shown in FIGS. 3A and 3B) thereof with the user's foot. Of course, the user may also bend down and operate the foot pedal with his or her hand.

The foot pedal connector portion 96 is rotatably mounted on the tubular axle 26 between the tubular portions 82 of the inner support members 80 to restrain lateral movement of the foot pedal 94 on the tubular axle. The brake rods 76 are each biased to move laterally inward toward the foot pedal 94 by a coil spring 95 mounted thereon inward of the outer support member 78 supporting the brake rod and outward of a pair of ears 97 formed on each brake rod.

As best shown in FIG. 5, the foot pedal 94 includes a cam 96 having a left cam surface 98 slidably engaged by an inward end 100 of the left brake rod 76 under the urging of the spring 95 mounted thereon, and a right cam surface 102 slidably engaged by an inward end 104 of the right brake rod under the urging of the spring 95 mounted thereon, as the foot pedal 94 is rotated between the disengaged and engaged positions, as best shown in FIGS. 3A, 3B, 4A and 4B. The inward end 104 of each brake rod 76 carries a plastic tip to reduce friction as the inward ends 100 and 104 of the brake rods slide along the left and right cam surfaces 98 and 102.

Figure 3A:
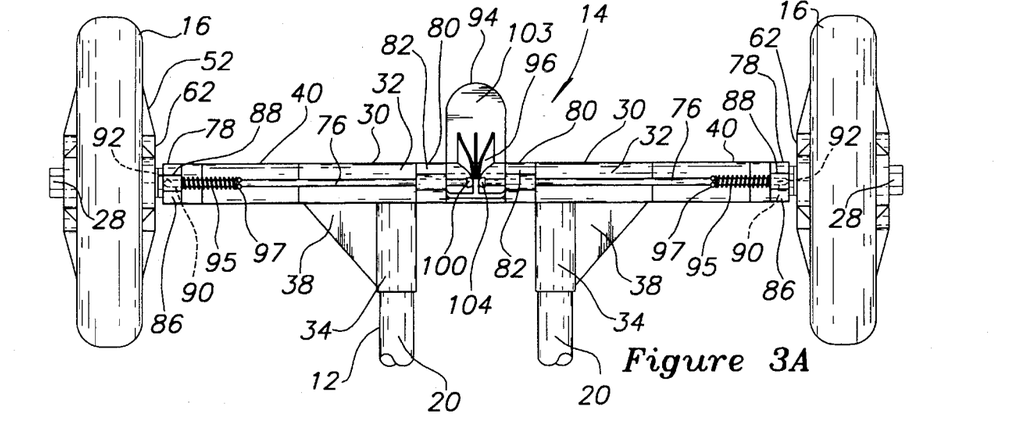
FIG. 3A is an enlarged, fragmentary, bottom plan view of the axle and park brake assembly of FIG. 1 shown with the brake disengaged.

The left and right cam surfaces 98 and 102 of the cam 96 each has a flat end portion 106 adjacent to the end portion 106 of the other which is engaged by a corresponding one of the inward ends 100 and 104 of the left and right brake rods 76 when the foot pedal 94 is in the disengaged position as shown in FIGS. 3A and 4A. When the foot pedal 94 is in this position, the brake rods 76 are moved inward under the urging of the springs 95 away from the receiver portions 62 with the outward ends 92 of the brake rods moved out of the receiver openings 64 to permit uninhibited rotation of the rear wheels 16. A shallow recess 108 is provided in each flat end portion 106 of the left and right cam surfaces 98 and 102 to receive a corresponding one of the inward ends 100 and 104 of the brake rods 76 therein to assist in holding the foot pedal 94 in the disengaged position.

Figure 3B:
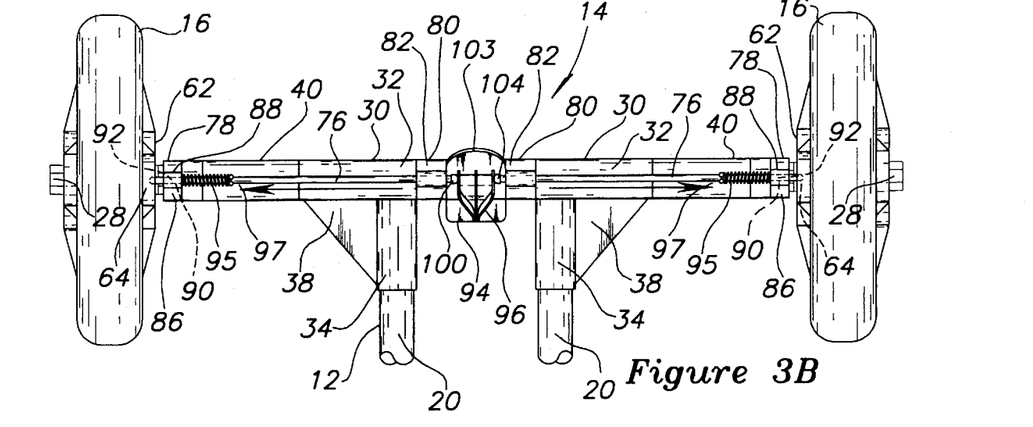
FIG. 3B is an enlarged, fragmentary, bottom plan view of the axle and park brake assembly of FIG. 1 shown with the brake engaged.

The left and right cam surfaces 98 and 102 of the cam 96 also each have a sloped midportion 110 which diverges in the laterally outward direction from the other cam surface to progressively move the left and right brake rods 76 laterally outward toward the corresponding left and right receiver portions 62, respectively, as the foot pedal 94 is moved from the disengaged position shown in FIGS. 3A and 4A toward the engaged position shown in FIGS. 3B and 4B. The sloped midportions 110 of the left and right cam surfaces 98 and 102 diverge sufficiently so that as the foot pedal 94 is rotated toward the engaged position, the outward ends 92 of the brake rods 76 will move laterally a sufficient amount to each enter into one of the receiver openings 64 with which aligned. The outward ends 92 each serve as a stop by engaging one or the other of the adjacent pair of ribs 68 which define the receiver opening into which the guide rod extends should the rear wheel 16 to which the receiver portion 62 is fixed begin to rotate as a result of the stroller 10 being left on an incline, being pushed, or otherwise.

The left and right cam surfaces 98 and 102 of the cam 96 also each include a flat end portion 112 laterally spaced apart from the end portion 112 of the other which is engaged by a corresponding one of the inward ends 100 and 104 of the left and right brake rods 76 as the foot pedal 94 is moved into the engaged position as shown in FIGS. 3B and 4B. The flat end portion 112 is oriented to produce substantially no lateral movement of the brake rods 76 as the foot pedal is moved through the final rotation to reach the engaged position. In that way, the laterally inward forces applied on the brake rods 76 by the springs 95 will not cause a rotational force on the cam 96 which could cause the foot pedal 94 to unintentionally rotate back toward the disengaged position. This serves to lock the brake rods 76 in their laterally extended positions in the receiver openings 64. A shallow recess 114 is also provided in each flat end portion 112 of the left and right cam surfaces 98 and 102 to receive a corresponding one of the inward ends 100 and 104 of the brake rods 76 therein to further assist in holding the foot pedal in the engaged position. The recess 114 also serves to create an audible noise when the inward ends of the brake rods snap into place to assure the user that the park brake is engaged.

To prevent rotation of the foot pedal 94 beyond the disengaged position when being moved thereto from the engaged position, the foot pedal has a stop wall 116 which engages the brake rods 76 to limit rotational movement of the foot pedal in one rotational direction. To prevent rotation of the foot pedal 94 beyond the engaged position when being moved thereto from the disengaged position, the underside 103 of the foot pedal is sized to serve as a stop which engages the brake rods to limit rotational movement of the foot pedal in an opposite rotational direction.

Figure 6:
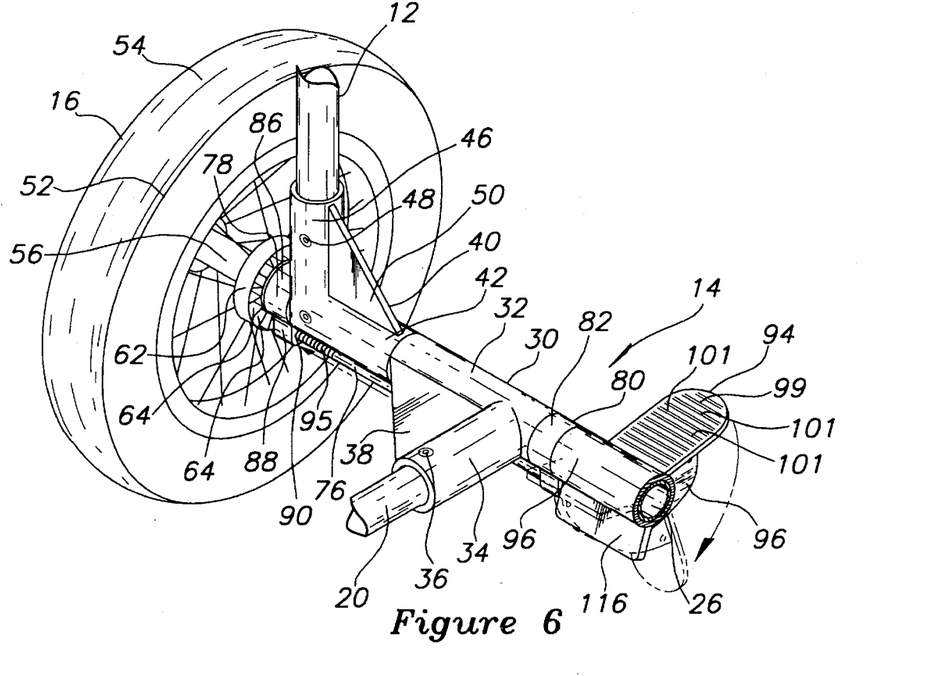
FIG. 6 is a fragmentary, isometric view of an alternative embodiment of the axle and park brake assembly of FIG. 1 showing the right side wheel.

An alternative embodiment of the rear wheel 16 incorporating the receiver portion 62 of the present invention is shown in FIG. 6. In this embodiment, the rear wheel utilizes conventional metal spokes 120 extending between the rim 52 and the hub 56, and the receiver portion 62 of the hub 5 is formed as a separate part and fixedly attached to the hub so that the receiver portion rotates with the rim. The receiver portion 62 is secured to the remainder of the hub 56 by the axle bolt using a nut (not shown) threadably received thereon in position between the receiver portion and the end of the tubular axle 26.

It will be appreciated that, although specific embodiments of the invention have been described herein for purposes of illustration, various modifications may be made without departing from the spirit and scope of the invention. Accordingly, the invention is not limited except as by the appended claims.

We claim:

1. A baby stroller, comprising:

a frame;

a forward wheel rotatably mounted to said frame;

an elongated non-rotating, tubular rear axle with left and right ends and having a longitudinal axis, said axle being attached to said frame;

a left rear wheel rotatably mounted to said left axle end;

a right rear wheel rotatably mounted to said right axle end;

a left receiver fixedly attached to said left wheel for rotation therewith, said left receiver having a plurality of receiver openings positioned in concentric relation with said axle and opening inward toward said right wheel;

a right receiver fixedly attached to said right wheel for rotation therewith, said right receiver having a plurality of receiver openings positioned in concentric relation with said axle and opening inward toward said left wheel;

a left brake rod movably supported by said axle for lateral movement toward and away from said left receiver but restrained against rotation about said axle, said left rod being movable a sufficient distance toward said left receiver to position an outward end of said left rod in one of said left receiver openings so as to inhibit rotation of said left wheel, and being movable a sufficient distance away from said left receiver to withdraw said outward end of said left rod from said left receiver openings so as to not inhibit rotation of said left wheel, said left rod having an inward end;

a right brake rod movably supported by said axle for lateral movement toward and away from said right receiver but restrained against rotation about said axle, said right rod being movable a sufficient distance toward said right receiver to position an outward end of said right rod in one of said right receiver openings so as to inhibit rotation of said right wheel, and being movable a sufficient distance away from said right receiver to withdraw said outward end of said right rod from said right receiver openings so as to not inhibit rotation of said right wheel, said right rod having an inward end; and an actuator assembly including a tubular connector body with a central aperture sized to receive said axle therethrough with said connector body mounted coaxially and rotatably on said axle for rotation about said axle axis, a rod actuator attached to said connector body for rotation therewith and in operative engagement with said inward ends of said left and right rods, and a manually operable foot pedal attached to said connector body and rotatable about said axle axis to rotate said connector body about said axle axis to a brake engagement rotational position in response to a manual force applied to said foot pedal to rotate said connector body in a first rotational direction and to a brake disengagement rotational position in response to a manual force applied to said foot pedal to rotate said connector body in an opposite, second rotational direction, said rod actuator moving said left and right rods toward said left and right receivers, respectively, and each of said outward ends thereof into a corresponding one of said left and right receiver openings when said connector body is rotated to said brake engagement position, and said rod actuator moving said left and right rods away from said left and right receivers, respectively, and each of said outward ends thereof out of said corresponding one of said left and right receiver openings when said connector body is rotated to said brake disengagement position.

2. The baby stroller of claim 1 wherein said actuator assembly includes a left bias member biasing said left rod away from said left receiver, and a right bias member biasing said right rod away from said right receiver.

3. The baby stroller of claim 2 wherein said rod actuator includes a cam carried by said connector body and having left and right cam surfaces, each engaging a corresponding one of said inward ends of said left and right rods so as to progressively move said left and right rods toward said left and right receivers, respectively, as said connector body is rotated from said brake disengagement position toward said brake engagement position, said inward ends of said left and right rods being held in sliding engagement with said left and right cam surfaces, respectively, by said left and right bias members.

4. The baby stroller of claim 3 wherein said left and right cam surfaces each include a recess to receive a corresponding one of said left and right inward ends of said left and right rods when said connector body is rotated to said brake engagement position.

5. The baby stroller of claim 3 wherein said left and right cam surfaces each include a lock portion engaged by said inward ends of said left and right rods as said connector body approaches said brake engagement position, said lock portion being oriented to produce substantially no lateral movement of said left and right rods as said connector body is rotated toward said brake engagement position.

6. The baby stroller of claim 2 wherein said rod actuator includes a cam carried by said connector body and having left and right cam surfaces, each engaging a corresponding one of said inward ends of said left and right rods so as to move said left and right rods toward said left and right receivers, respectively, as said connector body is rotated from said brake disengagement position toward said brake engagement position.

7. The baby stroller of claim 6 wherein said actuator assembly further includes a stop attached to said connector body for rotation therewith and arranged to engage said left and right rods and inhibit further rotation of said connector body in said second rotational direction beyond said brake disengagement position when said connector body is rotated to said brake disengagement position.

8. The baby stroller of claim 7 wherein said foot pedal is sized and arranged to engage said left and right rods and inhibit further rotation of said connector body in said first rotational direction beyond said brake engagement position when said connector body is rotated to said brake engagement position.

9. The baby stroller of claim 1 wherein said left and right wheels each includes a wheel hub and said left and right receivers comprise an integral part of said left and right wheel hubs, respectively.

10. The baby stroller of claim 1 wherein said left and right receivers each include a plurality of radially extending ribs which define said receiver openings therebetween.

11. The baby stroller of claim 10 wherein said radially extending ribs each have a wall thickness toward an inward edge thereof which tapers inward.

12. The baby stroller of claim 1 wherein said axle includes outward and inward left support members slidably supporting said left rod, and outward and inward right support members slidably supporting said right rod.

13. The baby stroller of claim 12 wherein said outward and inward left and right support members are attached thereto to inhibit their rotation about said axle and project away from said axle to hold said left and right rods spaced away from said axle.

14. The baby stroller of claim 12 wherein said inward left and right support members are spaced apart along said axle and attached thereto to inhibit their rotation and lateral movement relative to said axle, and said connector body is rotatably mounted on said axle between said inward left and right support members with said inward left and right support members inhibiting lateral movement of said connector body relative to said axle.

15. The baby stroller of claim 14 wherein said inward left and right support members each have a tubular body portion with a central aperture sized to receive said axle therethrough with said inward support member body portions mounted coaxially on said axle and coaxially with said connector body.

16. The baby stroller of claim 15 wherein said frame includes left and right generally upright frame members and left and right generally horizontal base frame members, said upright frame members each having a lower end connector portion through which said axle extends, and said horizontal base frame members each having a rear end connector portion through which said axle extends, one of said left rear end and left lower end connector portions and one of said right rear end and right lower end connector portions being rotatable relative to said axle for folding of said frame, said left lower end and left rear end connector portions being positioned on said axle between said outward and inward left support members to inhibit lateral movement of said rotatable one of said left lower end and left rear end connector portions relative to said axle, and said right lower end and right rear end connector portions being positioned on said axle tube between said outward and inward right support members to inhibit lateral movement of said rotatable one of said right lower end and right rear end connector portions relative to said axle.

17. The baby stroller of claim 16 wherein said left horizontal base frame member has a forwardly extending connector portion rigidly attached to said left rear end connector portion, and said right horizontal base frame member has a forwardly extending connector portion rigidly attached to said right rear end connector portion, with said left and right horizontal base frame members each having a rearward end thereof received within and fixedly attached to said left and right forwardly extending connector portions, respectively.

18. The baby stroller of claim 17 wherein said left and right rear end connector portions rotatably receiving said axle therein, and said left and right lower end connector portions are fixedly attached to said axle.

19. The baby stroller of claim 17 wherein a left gusset is rigidly attached to both of said left forwardly extending connector portion and said left rear end connector portion, and a right gusset is rigidly attached to both of said right forwardly extending connector portion and said right rear end connector portion.

20. The baby stroller of claim 1 wherein said left and right outward ends of said left and right rods project outward beyond said left and right axles ends, respectively, when said connector body is rotated to said brake engagement position.

21. A baby stroller, comprising:

a frame having a rear, transversely extending tubular frame member with left and right ends and a longitudinal axis extending therebetween;

a forward wheel rotatably mounted to said frame;

a left rear wheel rotatably mounted to said tubular frame member left end and having a plurality of circumferentially distributed openings on an inward side thereof;

a right rear wheel rotatably mounted to said tubular frame member right end and having a plurality of circumferentially distributed openings on an inward side thereof;

a left brake member supported by said frame for lateral movement relative to said tubular frame member toward and away from said left wheel, and restrained against rotation about said tubular frame member, said left brake member being outwardly movable to position an outward end thereof in one of said left wheel openings, and being inwardly movable to withdraw said outward end of said left brake member from said left wheel opening;

a right brake member supported by said frame for lateral movement relative to said tubular frame member toward and away from said right wheel, and restrained against rotation about said tubular frame member, said right brake member being outwardly movable to position an outward end thereof in one of said right wheel openings, and being inwardly movable to withdraw said outward end of said right brake member from said right wheel opening; and an actuator including a tubular connector body with a central aperture sized to receive said tubular frame member therethrough with said connector body mounted coaxially and rotatably on said tubular frame member for rotation about said longitudinal axis, a brake member actuator attached to said connector body for rotation therewith and in operative engagement with said left and right brake members, and a manually operable control member attached to said connector body and rotatable about said longitudinal axis to rotate said connector body about said longitudinal axis to a brake engagement rotational position in response to a manual force applied to said control member to rotate said connector body in a first rotational direction and to a brake disengagement rotational position in response to a manual force applied to said control member to rotate said connector body in an opposite, second rotational direction, said brake member actuator moving said left and right brake members toward said left and right wheels, respectively, to position each of said outward ends of said left and right brake members in a corresponding one of said left and right wheel openings when said connector body is rotated to said brake engagement position, and said brake member actuator moving said left and right brake members away from said left and right wheels, respectively, to withdraw said outward ends of said left and right brake members from said left and right wheel openings when said connector body is rotated to said brake disengagement position.

22. The baby stroller of claim 21 wherein said brake member actuator includes a cam carried by said connector body and engaging said left and right brake members to move said left and right brake members toward said left and right wheel openings, respectively, as said connector body is rotated from said brake disengagement position toward said brake engagement position.

23. The baby stroller of claim 21 wherein said left and right wheels each include a plurality of radially extending walls which define said left and right wheel openings therebetween.

* * * * *